Patented June 7, 1949

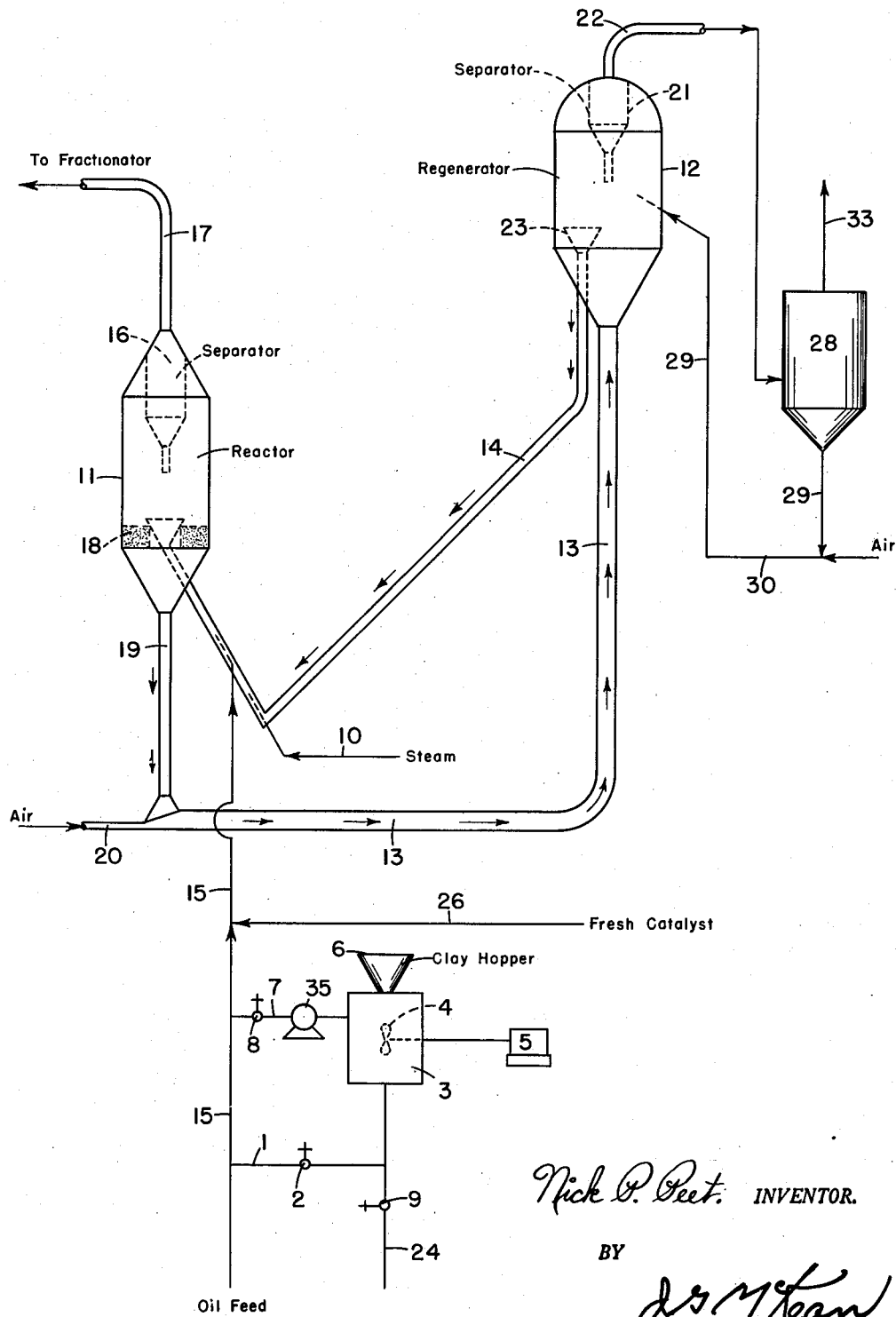

UNITED STATES PATENT OFFICE 2,472,723

METHOD FOR REMOVAL OF METAL COMPOUNDS FROM OIL FEED TO FLUID CATALYST CRACKING

Nick P. Peet, Goose Creek, Tex., assignor, by mesne assignments, to Standard Oil Development Company, Elizabeth, N. J., a corporation of Delaware Application June 5, 1947, Serial No. 752,804

2 Claims. (Cl. 196—50)

The present invention is directed to catalytic cracking of the fluid flow type. More particularly, the invention is directed to maintaining the activity and selectivity to desired products of fluidized catalyst employed in the process. The invention is further directed to a method for removing contaminants from feed stocks employed in the catalytic cracking process of the fluidized flow type.

There are two types of fluid catalytic cracking operations, the so-called "downflow" operation and the "upflow" method. In the downflow type of fluid flow catalytic cracking there is provided a reactor and a regenerator. Finely divided catalyst, in suspension in vapors of the hydrocarbons to be cracked, is fed into the bottom of the reactor. The velocity of the hydrocarbons is regulated so that hydrocarbon vapors carry the catalyst to an intermediate point in the reactor at which point there is a concentration of catalyst resulting in the forming of a dense zone from the outer annulus of which the catalyst particles drop to the bottom of the reactor from which they are withdrawn. Upon leaving the reactor the catalyst particles are picked up by a stream of hot air which carries them to the regenerator where the carbonaceous materials deposited on the catalyst in the reactor are consumed by combustion. The catalyst flow in the regenerator follows the same pattern as in the reactor with regenerated catalyst falling into a well in the lower section of the regenerator from which point it is fed back to the reactor. A detailed description of the downflow fluid flow catalytic cracking process is given in U. S. Patent 2,407,374 to Conrad H. Kollenberg, filed August 11, 1944.

In the upflow type of fluid flow catalytic cracking, a reactor and a regenerator are also employed. Finely divided catalyst, in suspension in vapors of the hydrocarbons to be cracked, is fed into the bottom of the reactor. The catalyst and the hydrocarbon vapors leave the reactor in a common stream and are separated in equipment provided for this purpose. The catalyst is then fed into the regenerator where the carbonaceous materials deposited on the catalyst in the reactor are burned off in the presence of controlled amounts of air. The catalyst from the regenerator is separated from the gaseous products of combustion and is then fed back to the reactor.

In either of the two types of fluid flow cracking, it is customary to employ separating means to separate the catalyst from the flue gases resulting from the combustion of the carbonaceous material in the regenerator. The type of separating equipment employed usually comprises cyclone separators and Cottrell precipitators. Ordinarily the regenerator of either type of fluid flow catalytic cracking unit includes either as an integral part or as auxiliary equipment cyclone separators which separate most of the catalyst from the products of combustion. However, a small amount of the catalyst of small diameter in the range from 0 to 20 microns diameter escapes with the flue gases and would be lost from the system unless other more efficient separating means than the cyclone separator are provided. Accordingly, Cottrell precipitators usually form a part of the fluid catalytic cracking unit and the flue gases containing the fine catalyst particles are usually routed to these precipitators where the fines are recovered substantially completely. It is customary to return the catalyst fines to the regenerator either directly or indirectly.

It is well known to employ either of these two types of fluid flow cracking to convert relatively high molecular weight hydrocarbons, such as heavy naphtha or gas oil and the like, to relatively low molecular weight hydrocarbons, such as light naphtha, in the presence of powdered catalyst comprising oxides of silicon and aluminum, silicon and zirconium, or silicon and titanium, certain specially activated natural clays, and the like at temperatures in the range of about 850° to 1100° F. In carrying out these conversions, the ferrous metal and alloy equipment may be eroded by the catalyst particles as they circulate through and impinge on the equipment. The metal or metals that are removed from the equipment by erosion are picked up by and are accumulated in the catalyst. It is generally known that iron is the principal metal accumulated in the catalyst as a result of erosion. Other metals, such as nickel, chromium, manganese, molybdenum, etc., accumulate in the catalyst as a result of erosion of equipment, but these metals are usually present in the catalyst in lower concentrations than iron, because iron is the more abundant construction metal in fluid flow types of catalytic cracking units in the form of steel and in alloys containing these latter-mentioned metals. It is well known to the art of fluid flow cracking that the presence of certain metals and metal oxides in the catalysts is extremely detrimental to the efficiency of the catalysts. It has been shown that the presence of these metals and their oxides in the catalyst results in the formation and deposition of large amounts of carbon on the catalysts and in the production of large amounts of undesirable gases. This degradation of the catalysts by metals and their oxides, particularly iron and its oxides, occurs to such an extent that it is often necessary to discard large amounts of expensive catalyst.

Besides the contaminating metals picked up by and accumulated in the catalyst, there are other contaminants which are introduced in the feed stock. These contaminants may be inorganic or organic contaminants which also cause a reduction in the catalyst activity and poor product distribution by allowing the formation of large quantities of dry gas and carbon, and resulting in reduced yields of gasoline and other useful products. These contaminants are usually salts of various metals and ashy constituents introduced when heavy feed stock such as those produced from crude residuums are employed in the catalytic cracking process. These contaminants are present in amounts of as much as 10 pounds per 1000 barrels of feed stock in spite of the fact that the crude residuum has been subjected to de-asphalting or other treatment and distillation to reduce the quantity of contaminants.

It is, therefore, the main object of the present invention to provide a method whereby the detrimental effects of metal salts and other contaminants introduced with the feed stock to a fluid catalytic cracking process are suppressed or substantially eliminated.

In accordance with the present invention, the detrimental effects of the aforementioned types of metal, metal oxide, and metal salt contaminants in feed stocks to fluid catalysts cracking processes are substantially eliminated by continuously contacting the feed stock with a small quantity of contact clay such as that used in lube oil contacting operations but having a substantially smaller particle size than found suitable for these latter mentioned operations. It is preferred that the individual particle size of the contact clay employed in the present invention have diameters in the range of 5 to 10 microns.

The present invention involves injecting the contact clay in the form of a slurry into the oil charged to the unit. Concentrations of contact clay in the feed hydrocarbon in the range of one-half of 1 pound of clay per barrel of feed stock will be sufficient and will not result in erosion of preheating equipment or lines carrying the mixture. It is important in order to avoid build up of concentrations of metal contaminants in the reaction zone, to choose the size of the particles of contact clay so that substantially all of the clay passes through the catalytic unit on a once through basis. Thus, in operations employing a fluidized catalyst containing 2 to 3% of catalyst fines having particle diameters in the range of 0 to 20 microns, contact clay also having particle diameters in the range of 0 to 20 microns may be used; preferably, however, a clay having particle diameters in the range of 5 to 10 microns should be employed to insure rapid loss from the system through the Cottrell precipitators.

The invention will be further illustrated by reference to the drawing in which the single figure is a flow diagram of one embodiment thereof.

Referring now to the drawing, numeral 11 designates a reactor and numeral 12 designates a regenerator zone of a fluid catalyst cracking operation. The reactor and the regenerator are fluidly connected by lines 19 and 13 transferring spent catalyst from the reactor to the regenerator and by line 14 transferring regenerated catalyst from the regenerator to the reactor. In the operation of this embodiment, a hydrocarbon which may boil in the gas oil boiling range and which may be produced from a crude residual stock is introduced into the system by way of line 15 which connects into line 14 and by way of which the hydrocarbon is introduced into the reactor. The major portion of the hydrocarbon feed introduced into the system by way of line 15 is charged direct to the reactor 11 by way of line 14. A small portion of the feed stock, however, may be withdrawn from line 15 by line 1 controlled by valve 2 and routed into tank 3 which is provided with an agitating means 4 motivated by prime mover 5. Tank 3 is provided with a clay hopper 6 which allows the introduction of contact clay to tank 3. The contents of tank 3 as an admixture of oil and clay from hopper 6 are discharged by means of pump 35 back into line 15 by way of line 7 controlled by valve 8.

It may be undesirable to employ the feed hydrocarbon as the means for slurrying the clay with the oil especially when the feed hydrocarbon is a processed residual stock having an appreciable viscosity which may resist the formation of a slurry. Under these conditions, it may be desirable to close valve 2 in line 1 and open valve 9 in line 24 to allow the introduction of a small quantity of a lighter hydrocarbon to serve as the slurrying means for the contact clay. Ordinarily, however, it will be unnecessary to use other than the feed hydrocarbon as the medium for carrying the contact clay into the system.

The oil introduced into the system through line 15 and line 14 mingles in line 14 with the hot regenerated catalyst at a temperature between 850° and 1100° F. and it is then introduced into reactor 11 which is of sufficient capacity to provide ample residence time for catalytic conversion. The oil vapors and catalyst particles are suspended and agitated in the reactor vessel and the reacted products leave the reactor vessel through a separation means which is shown in the drawing by dotted lines and is indicated by the numeral 16. This separation means may conveniently be a cyclone separator and removes catalyst particles from the product. The product substantially free of catalyst particles leaves the vessel 11 by way of line 17 which discharges it into a fractionator zone, not shown. The catalyst particles in the reactor 11 drop downwardly through a stripping section designated by numeral 18 in which hydrocarbons are removed from the catalyst particles by stripping with an inert gas or with steam introduced by means not shown. The stripped catalyst particles flow downwardly from reactor vessel 11 into line 19 which connects into line 13. The catalyst particles in line 19 are carried into line 13 by a blast of air introduced by line 20. The blast of air moves the catalyst particles from the vessel 11 to the vessel 12 and also supplies oxygen needed for combustion of the carbonaceous material fouling the catalyst. Air and spent catalyst mixture flow upwardly into the regenerator vessel 12 which is similar to reactor vessel 11 and is of sufficient capacity to provide residence time necessary for combustion of the carbonaceous material deposited on the catalyst in reactor 11.

Regenerator 12 is also provided with a separating means 21 which is shown by dotted lines and which may conveniently be a cyclone separator. The combustion gases are separated from the catalyst in the separating means 21 and leave the regenerator 12 by way of line 22 for routing to other separating means to remove finely divided catalyst which may escape separating means 21. Conveniently, the combustion gases in line 22 may be routed to a Cottrell precipitator 28 which is operated to recover substantially all of the catalyst fines and to allow loss from the system by way of line 33 of substantially all of the contact clay introduced into the system from clay hopper 6. It will be seen that by operating Cottrell precipitator 28 to lose selectively the contact clay, the contact clay is employed on a once-through basis and the contaminating materials in the feed stock are preferentially lost from the system. The catalyst fines which are recovered from the flue gases in Cottrell precipitators 28 by line 29 are returned to regenerator 12 from whence they follow the usual flow of regenerated catalyst in the system. To aid in the transportation of the catalyst fines to regenerator 12, a blast of hot air introduced by line 30 may be employed.

The regenerated catalyst from regenerator 12 drops into a funnel shaped member 23 which conducts the catalyst to line 14 and thence to reactor 11, steam or other gaseous or vaporous material being injected by line 10 to remove the catalyst from the regenerator 12 to the reactor 11.

As mentioned before, there may be lost from the system an amount of catalyst from Cottrell precipitator 28. This may be made up by injecting fresh catalyst through line 26.

In a typical operation in accordance with the present invention, a feed hydrocarbon comprising a stock produced from a residual crude fraction is charged to a fluid catalytic cracking until in an amount of 30,000 barrels per day. The oil may contain contaminating metallic compounds equivalent to about 5 to 10 pounds of metal per thousand barrels of feed stock. Approximately one-half pound of contact clay per barrel of oil which is equivalent to an amount of 7½ tons per day of clay should be injected. This amount of contact clay may be sufficient to effect 80 to 90% removal of the metallic contaminants in the feed hydrocarbon. It will be preferable to control the size of the clay particles employed to particle diameters in the range of 5 to 10 microns to insure loss of this material from the Cottrell precipitators. Otherwise, build up of contact clay contaminated with metal particles in the system might occur and work deleteriously on the catalytic conversion operation.

The employment of contact clay of 5 to 10 micron particle sizes allows the use of this material in pretreating the feed stocks to a fluid catalyst cracking unit without penalty to the lube oil contacting operation since the small diameter contact clay particles are unsuitable for lube oil contact operations due to the low filtration rates obtained when these materials are used in this service. The contacting material employed in the practice of the present invention may be derived from the various fuller's earth, bentonites, various clays, etc., of the type satisfactory for contacting lubricating oils and other hydrocarbon fractions. The material may have been previously treated with dilute mineral acid or other material to improve its activity prior to use in the practice of my invention.

The amount of contact clay employed in the practice of the present invention will usually range from one-half to one pound of clay per barrel of oil charged. However, larger quantities may be desirable especially in those instances where it is necessary to effect a reduction in the carbon content of the heavy feed stock employed in the present invention. For example, stocks produced from crude residual fractions may require the injection of contact clay in an amount of 37 to 40 tons per day. Employment of this amount of contact clay not only will result in the removal of contaminating metal compounds, but will also reduce the carbon content of the feed stock and thus result in further improved operation. Usually, however, smaller quantities in the range from about 2 to 10 tons per day of contact clay per 30,000 barrels per day of oil will be sufficient.

The feed stock to be employed in the practice of the present invention will be gas oil hydrocarbons and heavier. Ordinarily, gas oil hydrocarbons do not contain large amounts of contaminating materials. Therefore, the invention has greatest application to processing, by the fluid catalytic cracking process, stocks produced from heavy crude residuums, and other tar-like materials resulting from the refining of crude petroleum. However, it is within the scope of the present invention to charge to the fluid catalytic cracking process any hydrocarbon feed which contains substantial quantities of contaminating metals, metal oxides, and salts of metals.

The nature and objects of the present invention having been fully described and illustrated, what I wish to claim as new and useful and to secure by Letters Patent is:

1. A method for treating a residual hydrocarbon feed stock containing contaminants, which is charged to a fluid catalytic cracking operation embodying a reaction and a regeneration zone and a recovery zone for the catalyst which comprises admixing at least a portion of the hydrocarbon feed stock with contact clay having a particle size in the range between 5 and 10 microns, slurrying the admixture, introducing the slurry into hydrocarbon feed stock, adding catalyst to the admixture of slurry and hydrocarbon feed stock and charging this admixture to a reaction zone maintained under conversion conditions, separating reaction products from the catalyst and contact clay, regenerating the catalyst and contact clay in a regeneration zone under combustion conditions to form a mixed phase of products of combustion and catalyst and contact clay, separating catalyst from products of combustion and contact clay in a recovery zone, discarding the products of combustion and the spent contact clay from said recovery zone, and returning the catalyst from said recovery zone to the system.

2. A method for treating a residual hydrocarbon feed stock containing contaminants which is charged to a fluid catalytic operation embodying a reaction and a regeneration zone and a recovery zone for the catalyst which comprises forming a slurry of contact clay having particle sizes in the range between 5 and 10 microns with a hydrocarbon, introducing the slurry into the residual hydrocarbon feed stock to form a mixture of contact clay and hydrocarbon feed stock in the range of one-half to 5 pounds of clay per barrel of feed, adding catalyst to the mixture of feed hydrocarbon and contact clay, charging the admixture to a reaction zone maintained under conversion conditions, separating reaction products from the catalyst and contact clay, regenerating the catalyst and contact clay in a regeneration zone under combustion conditions to form a mixed phase of products of combustion and catalyst and contact clay, separating catalyst from products of combustion and contact clay in the recovery zone, discarding the products of combustion and the spent contact clay from the recovery zone, and returning substantially all of the catalyst from the recovery zone to the regeneration zone.

NICK P. PEET.

REFERENCES CITED

The following references are of record in the file of this patent:

UNITED STATES PATENTS

| Number | Name | Date |
| --- | --- | --- |
| 2,361,978 | Swearingen | Nov. 7, 1944 |
| 2,378,531 | Becker | June 19, 1945 |
| 2,382,755 | Tyson | Aug. 14, 1945 |
| 2,407,374 | Kollenberg | Sept. 10, 1946 |